United States Patent
Stromotich et al.

(10) Patent No.: US 9,585,419 B2
(45) Date of Patent: Mar. 7, 2017

(54) APPARATUS AND METHOD FOR DEHYDRATION USING MICROWAVE RADIATION

(71) Applicant: NuWave Research Inc., Burnaby (CA)

(72) Inventors: Greg Stromotich, Burnaby (CA);
Terumi Stromotich, Burnaby (CA);
Paul Burgener, Nelson (CA)

(73) Assignee: NUWAVE RESEARCH INC. (CA)

( * ) Notice: Subject to any disclaimer, the term of this patent is extended or adjusted under 35 U.S.C. 154(b) by 0 days.

(21) Appl. No.: 14/443,463

(22) PCT Filed: Nov. 18, 2013

(86) PCT No.: PCT/CA2013/050880
§ 371 (c)(1),
(2) Date: May 18, 2015

(87) PCT Pub. No.: WO2014/075193
PCT Pub. Date: May 22, 2014

(65) Prior Publication Data
US 2015/0313273 A1 Nov. 5, 2015

Related U.S. Application Data

(60) Provisional application No. 61/727,563, filed on Nov. 16, 2012.

(51) Int. Cl.
*F26B 3/34* (2006.01)
*A23L 3/01* (2006.01)
(Continued)

(52) U.S. Cl.
CPC *A23L 3/01* (2013.01); *A23B 4/01* (2013.01); *A23B 7/01* (2013.01); *A23B 9/04* (2013.01);
(Continued)

(58) Field of Classification Search
CPC . A23L 3/01; A23L 3/0155; A23L 3/54; A23B 7/01; A23B 4/01; A23B 9/04;
(Continued)

(56) References Cited

U.S. PATENT DOCUMENTS 3,789,296 A 1/1974 Caruso, Jr. et al.
3,965,416 A 6/1976 Friedman
(Continued)

FOREIGN PATENT DOCUMENTS

CA 1248348 1/1989
CA 2291048 12/1998
(Continued)

OTHER PUBLICATIONS

Shaheen et al., "Microwave Applications in Thermal Food Processing", ISBN 978-9853-51-0835-1. Published: Nov. 7, 2012 http://www.intechopen.com/books/the-development-and -application-of-microwave-heating/microwave-applications-in-thermal-food-processing.
(Continued)

*Primary Examiner* — Jiping Lu
(74) *Attorney, Agent, or Firm* — Renner Kenner Greive Bobak Taylor & Weber

(57) ABSTRACT

An apparatus for extracting a vaporizable substance, from a material containing such substance, comprises an irradiation chamber for irradiating the material with electromagnetic radiation to vaporize the substance. The substance may comprise water and the material is dehydrated. The electromagnetic radiation comprises microwaves. The irradiation is conducted in the near-field range of the electromagnetic radiation. In one aspect, the electromagnetic radiation within the waveguide evanescently couples with the material.

31 Claims, 7 Drawing Sheets

(51) Int. Cl.
| | |
|---|---|
| A23L 3/54 | (2006.01) |
| A23L 3/015 | (2006.01) |
| A23B 4/01 | (2006.01) |
| A23B 7/01 | (2006.01) |
| A23B 9/04 | (2006.01) |
| F26B 5/04 | (2006.01) |
| F26B 15/18 | (2006.01) |
| F26B 17/04 | (2006.01) |

(52) U.S. Cl.
CPC ............... *A23L 3/0155* (2013.01); *A23L 3/54* (2013.01); *F26B 5/048* (2013.01); *F26B 15/18* (2013.01); *F26B 17/04* (2013.01); *A23V 2002/00* (2013.01)

(58) Field of Classification Search
CPC .......... F26B 15/18; F26B 17/04; F26B 5/048; A23V 2002/00
See application file for complete search history.

(56) References Cited

U.S. PATENT DOCUMENTS

| | | | |
|---|---|---|---|
| 4,045,639 A * | 8/1977 | Meisel ................... | F26B 5/041 219/686 |
| 4,370,534 A | 1/1983 | Brandon | |
| 4,640,020 A | 2/1987 | Wear et al. | |
| 4,896,005 A * | 1/1990 | Skubich ................... | A23L 3/01 219/700 |
| 5,555,641 A * | 9/1996 | Lee ....................... | D06F 58/266 34/261 |
| 6,037,908 A | 3/2000 | Phillips et al. | |
| 6,225,592 B1 * | 5/2001 | Doughty ........... | H01J 37/32192 118/723 AN |
| 8,299,408 B2 | 10/2012 | Kimrey, Jr. | |
| 2007/0038196 A1 | 2/2007 | Karlsson et al. | |
| 2007/0079523 A1 * | 4/2007 | Kimrey, Jr. ............. | F26B 3/347 34/79 |

FOREIGN PATENT DOCUMENTS

| | | | | |
|---|---|---|---|---|
| EP | 1935485 | | 6/2008 | |
| WO | WO2007038196 | | 4/2007 | |
| WO | 2012009859 | | 1/2012 | |
| WO | WO2012009859 | | 1/2012 | |
| ZA | WO 2010046712 A2 * | | 4/2010 | ............. B02C 19/18 |

OTHER PUBLICATIONS

Zhang et al, "Trends in Microwave Related Drying of Fruits and Vegetables", Trends in Food Science & Technology, 17 (2006), 524-534.

Gideon Kantor, et al. A 2450 MHz Slab Loaded Direct Contact Applicator with Choke; 5 pages, Dec. 1980.

European Patent Office; Supplementary European Search Report; May 27, 2016; 2 Pages.

* cited by examiner

APPARATUS AND METHOD FOR DEHYDRATION USING MICROWAVE RADIATION

CROSS REFERENCE TO PRIOR APPLICATIONS

This application claims priority under the Paris Convention to U.S. Application No. 61/727,563, filed Nov. 16, 2012, the entire contents of which are incorporated herein by reference.

FIELD OF THE INVENTION

The present disclosure relates to apparatus and methods for microwave dehydration, and in particular to the microwave dehydration of temperature-sensitive organic and biological materials.

BACKGROUND OF THE INVENTION

The dehydration of various materials by exposure to microwave radiation at reduced atmospheric pressures is well studied. See, for example, M. Zhang et al, "Trends in Microwave Related Drying of Fruits and Vegetables", Trends in Food Science & Technology, 17 (2006), 524-534 (the entire contents of which is incorporated herein by reference). In general, a reduction in atmospheric pressure reduces both the boiling point of water and the oxygen content of the atmosphere. Vacuum microwave dehydration, VMD, processes may accordingly permit dehydration to occur in the absence or reduction of oxygen, and without exposing the material that is being dehydrated to significantly elevated temperatures, thereby yielding dried products that may have better physical, organoleptic and/or chemical qualities as compared with dried products obtained using other known dehydration processes such as hot air convection or freeze drying. VMD processes may also be relatively quick and energy-efficient as compared with many other dehydration processes. Temperature and/or oxygen sensitive materials of the sort that are known to be amenable to drying by VMD include, but are not limited to, food products such as fruits, vegetables, berries, herbs, meats, fish, seafood, dairy products, prepared foods, seeds, grains, roots and tubers, as well as a wide variety of agricultural feed products, pharmaceutical and nutraceutical products, dietary supplements, synthetic organic compounds, and the like.

As is well known, VMD may be carried out as a batch or continuous process, and a typical VMD apparatus will comprise at least a vacuum chamber (in which an input material is dehydrated into an end product), a source of microwave radiation, and associated sensing equipment (e.g. infra-red detectors) and control equipment (e.g. a programmable logic controller, "PLC") to monitor the status of the product during the dehydration procedure and to make desired or necessary adjustments. For example, such monitoring may include monitoring the surface temperature of the material (such as by using infrared detection) or surface texture (e.g. wrinkling). In continuous VMD processes, the apparatus will also typically comprise input and output means such as air locks that permit the input material and end product to enter and exit the vacuum chamber, respectively, without disrupting the vacuum level, and a conveying means (e.g. a conventional conveyor belt) to convey the material through the vacuum chamber between the input and output ends.

It has generally been established in relation to known VMD processes that a higher microwave field strength will have a greater effect (as measured over the complete drying cycle) on increasing the rate of dehydration than does a deeper vacuum. A primary focus of current state of the art VMD apparatus and process engineering has accordingly been to maximize the intensity of microwave radiation that can be applied to the material being dried.

In keeping with the general objectives of maximizing microwave field intensity while controlling the temperature gain of the material being dried, the microwave emitters (e.g. magnetrons) of current VMD apparatuses are typically located outside of the vacuum, or irradiation chamber where they may be operated under atmospheric conditions (and protected from the conditions within the chamber). The microwave radiation generated by the emitters enters the vacuum chamber through one or more microwave-transparent windows typically after being conveyed through one or more waveguides. Various microwave waveguides are known in the art. Non-gas dielectric waveguides include microstripline, coaxial, and stripline types. However, such dielectric waveguides convert some of their energy into heat (i.e. are "lossy"), and typically cause microwave fields to be established on the outside surfaces of the waveguide. For most microwave applications, this results in microwave radiation interacting with anything that happens to be near the dielectric waveguide. For these reasons, the waveguides used to convey microwaves from the emitter to the irradiation chamber are generally also maintained outside of the chamber. Such placement serves to reduce the occurrence of high voltage standing waves caused by reflection of microwaves, which may lead to arcing within the waveguide. Thus, in typical known microwave dehydration apparatuses and methods, the material to be dehydrated is generally subjected to microwave radiation in the far-field region.

In general, as is known in the art, the power density in the electromagnetic far-field region is reduced as the square of the distance from the source. However, within the near-field region (i.e. a distance that is within about one wavelength of the electromagnetic radiation, but possibly extending so far as to include a transition zone ending within about two wavelengths), very high electromagnetic fields that do not decrease as the square of the distance may occur. This enables relatively high field strengths to be developed within the near-field region.

There exists a need for an improved apparatus and/or method for dehydrating materials, such as food products and the like, using microwave radiation that overcomes at least one of the deficiencies known in the art.

SUMMARY OF THE INVENTION

In one aspect, the invention provides an improved apparatus and method for extracting a vaporizable substance from a material using application of electromagnetic radiation in the near-field range. In one example, the substance is water and the apparatus and method comprises the application of microwave radiation to the material. The material can be any organic or inorganic material, including fruits and vegetables or extracts thereof. In a preferred embodiment, the irradiation is conducted under vacuum conditions.

In one aspect, the invention provides an apparatus for vaporizing a vaporizable substance from a material, the vaporizable substance being subject to vaporization upon exposure to electromagnetic radiation, the apparatus comprising:

an irradiation chamber;

an electromagnetic wave generator; and, a waveguide adapted to direct the generated electromagnetic waves towards the material and to irradiate the material in a near-field region of the electromagnetic waves.

In another aspect, the invention provides a method for vaporizing a vaporizable substance from a material, the vaporizable substance being subject to vaporization upon exposure to electromagnetic radiation, the method comprising:

providing a raw material containing the vaporizable substance;

introducing the raw material into an irradiation chamber;

irradiating the raw material with electromagnetic radiation in the near field range, the electromagnetic radiation being sufficient to heat and vaporize the substance, thereby resulting in a treated material wherein a portion of the substance has been extracted from the raw material; and, removing the treated material from the irradiation chamber.

In another aspect, the invention provides a system comprising a plurality of apparatuses described herein, and wherein the material is treated sequentially to the same or different irradiation conditions.

BRIEF DESCRIPTION OF THE DRAWINGS

For a fuller understanding of the nature and advantages of the disclosed subject matter, as well as the preferred mode of use thereof, reference should be made to the following detailed description, read in conjunction with the accompanying drawings. In the following drawings, like reference numerals designate like or similar parts or steps.

FIG. 2b is an end perspective view of the embodiment of FIG. 2a.

DETAILED DESCRIPTION OF A SPECIFIC EMBODIMENT

Figure 1:
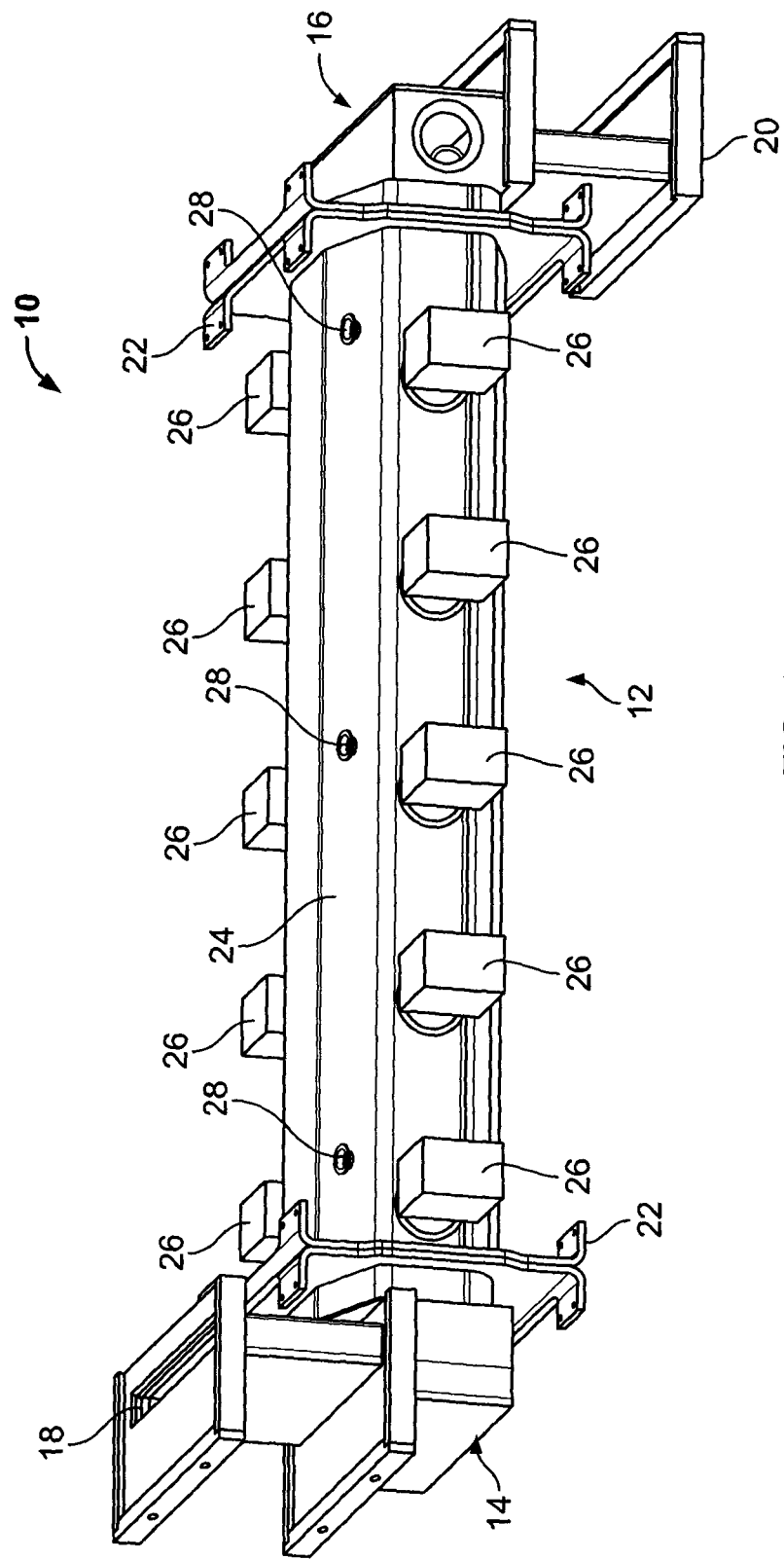
FIG. 1 is a side perspective view of a microwave dehydration apparatus in accordance with an embodiment of the disclosed subject matter.

Throughout the following description and the drawings, in which corresponding and like parts are identified by the same reference numerals, specific details are set forth in order to provide a more thorough understanding of the presently-disclosed subject matter to persons of skill in the art. However, well known elements may not be shown or described in detail to avoid unnecessarily obscuring the disclosure. Accordingly, the description and drawings are to be regarded in an illustrative rather than a restrictive sense.

In the present description, reference will be made to the terms "irradiation chamber" and "vacuum chamber". The term "irradiation chamber" will be understood as comprising a chamber wherein electromagnetic radiation, preferably microwaves, are applied to a material to effect dehydration or removal of a vaporizable component of the material. In cases where such irradiation is conducted under a vacuum, the term "vacuum chamber" may be used to refer to the irradiation chamber. In some embodiments, the irradiation chamber may be pressurized to a pressure greater than atmospheric pressure. In other embodiments, no pressure or vacuum is applied to the irradiation chamber. As discussed further below, due to the manner in which electromagnetic energy is transmitted to the material being treated, very little if any leakage of electromagnetic radiation escapes from the material. As such, the irradiation chamber would not require any shielding or such, in which case the term "irradiation chamber" will be understood to mean an "irradiation zone" or "irradiation region" since a discrete enclosure would not be needed. Thus, as used herein, the term "chamber" does not necessarily imply a complete enclosure.

The following description is primarily directed to the removal of water, or dehydration, of a given feed material. Such dehydration is preferably performed using electromagnetic radiation, preferably microwave radiation. As will be appreciated by persons skilled in the art, the apparatus and method described herein can be used to remove any vaporizable substance.

In addition, although the present description is primarily directed to the removal of a vaporizable substance, the apparatus and method of the invention can also be used to simply heat a material and/or to sterilize same. For example, in one aspect, a water containing material, such as wood and the like, can be processed with the apparatus or method of the invention in order to heat but not vaporize the water contained therein. In such case, the material being treated may be subjected to a pressure greater than atmospheric pressure, whereby vaporization of water is inhibited or prevented. The temperature of the material can then be elevated to the desired sterilization temperature, which can be maintained for a desired period of time.

In one aspect, as described in the present disclosure, the invention provides an apparatus and method that utilizes a waveguide, such as a non-gas dielectric waveguide, for delivering microwave radiation for the purposes of dehydrating materials (in particular organic materials, such as temperature-sensitive organic and biological materials, including fruits and vegetables). In one aspect, the invention comprises the near-field delivery of microwave radiation to the materials to be dehydrated. This is facilitated by the use of one or more waveguides, which allow microwave radiation to be confined to the waveguide and surrounding space right up to the point of use, where the material being dehydrated is placed on or within the surrounding near-field region. Without being restricted to any particular theory, it is believed that exposure to microwave radiation at such proximity results in evanescent coupling of the electromagnetic radiation emitted by the waveguide (acting as a source) and the material (acting as a receiver).

By placing the, material being dehydrated within the near-field of a dielectric waveguide, a high power field can be brought to the surface of the dielectric waveguide and used to engulf the material in high field levels without experiencing significant reflection or transmission of the microwave radiation within an irradiation chamber, as would occur when a microwave beam in free space (i.e. far-field radiation) hits dehydrating material that has reached a state of low moisture content and become a poor absorber of the microwave radiation. As known in the art, as the moisture content of a material decreases, it generally becomes less lossy, making it increasingly difficult to dissipate sufficient power throughout the material and it becomes necessary to surround the material with a high strength field. By irradiating the material within the near-field region, the electromagnetic field may be concentrated on or near the surface of the waveguide and into the material to be dehydrated. Conversely, in a gas-filled waveguide that is transmitting through free space, the electric field needs to increase to pass more current through the impedance of the material to be dehydrated, and the increase in voltage may lead to arcing.

In current state-of-the-art VMD apparatuses and processes, vacuum and water vapor conditions within the vacuum chamber may create microwave ionization concerns. Arcing can occur when microwaves transition into the vacuum chamber, and/or from reflections and edge effects within the chamber, causing high voltage fields to be established and to ionize the water vapor in the chamber (and resulting in breakdown arcs or discharge that may damage the apparatus and/or the material being dehydrated). Conversely, the non-gas dielectric waveguide according to one aspect of the present disclosure couples the microwave radiation to the material in the near-field, such that the material acts akin to a lossy defect in the surface of the waveguide, thereby avoiding the generation of high voltage far-field conditions. Constraining at least part of the microwave radiation to non-free space operation in the waveguide thus reduces ionization and breakdown.

With waveguides having a high dielectric constant, the microwaves are mostly contained within the dielectric material. When it is desired to have the microwaves directed to a surface adjacent to the material being dehydrated, a transition to a lower dielectric constant material can be used or the dielectric material can be made thinner. This provides flexibility in design without creating high power microwave fields propagating through the free space of the vacuum chamber. To further enhance the design choices, metallic or highly conductive patterns can be applied on or in the dielectric material, thereby allowing the microwaves to travel within the dielectric and the conductors.

As outlined above, the waveguides of the invention allow microwaves to travel there-along until they are dissipated in a lossy material. This characteristic provides a mechanism to supply microwave power directly to the material being dehydrated, i.e. within the near-field region, and to not just randomly reflect off surfaces in an irradiation chamber, as would occur when a free space beam of microwave radiation is used to irradiate a particular area in the chamber. In one embodiment, the material to be dehydrated is spaced on the waveguide (or, for example, on a conveyor belt that has been configured as a dielectric waveguide). In such embodiment, the microwave radiation continues along the waveguide until it reaches the material. In another embodiment, the material may be provided on a conveyor belt and the waveguide may include gaps, or void spaces may be present between a series of individual waveguide elements in a single apparatus, which are sized to permit near-field coupling to adjacent waveguide elements to continue.

In some embodiments, a non-gas dielectric waveguide may comprise a liquid, solid or semi-solid, or a suspension. The use of a "flowing" dielectric material as a waveguide provides not only a waveguide for microwave containment, but also a mechanism to change the properties of the dielectric in a continuous or stopped flow condition. This allows cooling or heating to be delivered to the dielectric material and, through conduction and radiation, also to the material being dehydrated. Besides changing of temperature, the dielectric properties of the waveguide can be altered by changing the properties of the fluid and, by flowing it through appropriate valves, allowing the dielectric properties to more closely match the conditions required to provide the necessary conditions to couple power into the dehydrating material as its electromagnetic absorption properties change. Dielectric properties of the waveguide can be altered through change of chemical composition, addition or removal of suspended particles such as metal and carbon particles, colloids, melted materials, gels and slurries, and the like. In some embodiments, the changing dielectric properties of the material being heated and dehydrated may themselves be utilized in the calculation and/or control of the dielectric waveguide materials and properties. Furthermore, by altering the dielectric properties of the non-gas dielectric waveguide, the wavelength of the microwaves may be altered to better couple to the material being dehydrated, and to match the material load to the output of the microwave generator without requiring adjustment of operating frequency. This allows high power, low cost magnetron microwave sources to be utilized instead of higher cost variable-frequency microwave sources.

A non-gas dielectric waveguide according to an aspect of the present invention may be shaped to act not only as a waveguide, but also as a microwave lens. Refractive lenses can be formed in manners known to those of skill in the art to concentrate microwave radiation to a certain location or plane. These lenses may be solid surfaces such as concave and convex optical lenses or they may provide focusing through Fresnel shaped lenses. A pattern of conductive material may also be applied to or inserted into, the dielectric material to form lenses. These techniques constrain the microwaves to dielectric materials which prevent or reduce the development of free space high voltages and arcing in a vacuum environment.

In yet further embodiments, a non-gas dielectric waveguide may comprise multiple layers of dielectric materials to affect the dielectric and waveguide properties. Alternating layers of conductive materials and dielectric materials may also be used. Typically, the reduced atmosphere or vacuum within a VMD apparatus provides a high potential difference between the free space and the dielectric waveguide, which tends to assist in containment of the microwave radiation within the dielectric waveguide material. However, if the waveguide needs to pass near some location where power would be passed into another component, then a layer of material can be added to the waveguide to provide a different refractive index or reflective property.

Similarly, non-gas dielectric waveguides having different loss properties in different locations may be used. Such waveguides allow the microwave radiation to act as a mechanism for heating the waveguide material and to provide conductive and radiative heating of the dehydrating material as it rests on or near the dielectric waveguide. Susceptors can be utilized in free space microwave heating, but this requires more complex manufacturing and is sensitive to mechanical stability of the susceptor near the material. Absorption of microwaves by susceptors is also dependent on the microwave path within a chamber and the shape of the susceptor to the plane of the microwave. When stirrers and even different dehydrating material shapes and loading are present in a chamber, the internal microwave distribution changes. With a dielectric waveguide that incorporates a lossy dielectric material, the microwave radiation is delivered and matched to the waveguide as the waveguide will constrain the microwave radiation to a defined path. The average power may decrease due to loss to the dehydrating material, but the wave characteristics remain the same as the wave travels along the dielectric waveguide. This characteristic also allows for incorporation of proper termination of the waveguide so no reflections or standing waves are generated in the waveguide, which is important in preventing high voltage nodes from developing in free space that may lead to arcing within a vacuum environment.

A non-gas dielectric waveguide may also comprise different surface characteristics. Patterns of sharp edges such as narrow points, triangles, ridges, etc. can be added to the surface of the waveguide and thereby change the local field intensities. Sharp edges or points can increase field strength within a very short distance and that can be beneficial when trying to create a strong field into small dehydrating materials such as a single berry on a conveyor. The use of the dielectric waveguide in the near-field allows patterning of the surface, which helps to deliver the microwave power to the material while not affecting the creation of high voltage discharge points. The near-field patterning would be non-propagating into free space.

In further aspects of the presently disclosed subject matter, electromagnetic (e.g. microwave) radiation is evanescently coupled to the material being heated or dehydrated, and the magnitude of non-coupled electromagnetic radiation within the apparatus is sensed using antennae such as horns, slotted waveguides, patch and stripline to collect the unabsorbed microwaves which have passed though the material to be dehydrated. The antennae feed a microwave circuit which detects phase or intensity and sends a voltage to the controller using principles as taught in, for example, U.S. Pat. Nos. 3,789,296 and 3,965,416. Commercial devices such as the Hydronix Hydro-Probe™ can be utilized as a self-contained microwave moisture sensor and used to quantify the current dielectric value of the material being coupled. In combination with the results of a thermal sensor, the current moisture level of the material can thus be determined. This information in turn can be used to control the power, phase, dielectric property and/or frequency of the microwave emitter, and/or the vacuum level in the vacuum chamber, in a manner that maximizes the effectiveness of vaporization and minimizes the risk of thermal runaway, carbonization or application of excess radiation and damaging the material being dehydrated. A plurality of such sensors and emitters may be employed along a pathway that the material being dehydrated travels through the apparatus, and the application of energy and temperature can thus be controlled throughout the dehydration process. Such configurations allow the dielectric measurements and thermal measurements of the product as it is conveyed through the apparatus to be sent to a programmable logic controller, or PLC, and result in the dielectric profile of the material being dehydrated to be utilized in the control of the dehydration process.

It is well known that moisture content will change dielectric constant and that the measurement of the dielectric content of a product being dehydrated can be used to determine the progress of the dehydration. However, for the control of the microwave power to maintain an internal temperature of the material being dehydrated, it is necessary to predetermine the dielectric constants of the product to be processed in advance of entering the MVD apparatus. This requires measurements of the product at varying levels of dehydration to create a calibration set of data which is sent to the control PLC or computers in order for them to maintain the vacuum pressure and the applied microwave power and/or frequency at the desired levels for each stage of the dehydration process. Optimum processing requires product-specific data as dielectric measurements are also affected by other physical and chemical factors, such as the salt content, the size of the particles, and the packing density. The approach described in relation to some embodiments of the presently-disclosed subject matter herein differs from previous attempts to use dielectric constant to measure moisture in that the dielectric constant of the actual material to be processed is pre-measured in the same form that will be entering the VMD apparatus, such that the VMD measurement of the dielectric constant will be calibrated to the actual state of dehydration.

In embodiments where internal microwave emitters are incorporated along the surface used to convey the material being dehydrated, sensing and control capabilities are especially important. The ability to determine, with for example embedded circuitry, the dielectric characteristics of the material as it passes over an emitter allows the emitted microwaves to be adjusted in an optimized operation for that particular part of material at that particular place and time. An array of emitters with sensing and control circuitry may then adapt to any piece of material as it passes through each emitting element of the array. In a preferred embodiment, the sensing circuitry may be built into the emitters and use signals derived from a partial reflection of the microwaves being used to heat the material to be dehydrated. The use of low power solid state emitters in array panels of hundreds of emitters then provides for a full coverage of the material being dehydrated and can still deliver the same total power of single modules of higher power generators. The use of small dielectric waveguides and lenses will then protect the emitters and circuitry operating within the vacuum vessel, while delivering microwaves to all the conveyor surfaces.

In yet other embodiments, if it is desired to dehydrate materials without taking advantage of the lower boiling point that is provided by reduced atmospheric conditions, non-oxygen gases may be utilized to provide an atmosphere that is not oxidizing, thereby permitting dehydration of oxygen-sensitive materials at atmospheric pressures and above. The use of a non-gas dielectric waveguide (and any substrates, such as lenses, etc.) is still advantageous when utilized in non-vacuum conditions where the existing atmosphere could otherwise ionize and lead to arcing.

The Figures attached hereto illustrate one embodiment of a microwave dehydration apparatus of the invention, comprising a single vacuum chamber with a continuous feed of material to be dehydrated. In the embodiment illustrated, the apparatus includes waveguides, as described herein, to direct microwave radiation towards materials to be dehydrated. Although the figures illustrate one, preferred embodiment of the invention comprising an apparatus and method utilizing a conveying means (such as a conveyor belt) for treating material in a continuous process, it will be appreciated that the invention may also be practiced in a batch format. In addition, although the illustrated embodiment illustrates one irradiation chamber, it will be understood that multiple chambers may also be provided in other embodiments. Such multiple chambers need not all be vacuum chambers. Various other embodiments would be apparent to persons of ordinary skill in the art in view of the teaching of the present disclosure.

A dehydrating apparatus according to an embodiment of the invention is illustrated generally at 10 in FIG. 1. The apparatus 10 comprises a processing unit 12 in which a material to be dehydrated may be dehydrated by exposure to microwave radiation to produce a dehydrated product. The dehydrating apparatus 10 includes an input feed unit 14 and an output feed unit 16 to permit the entry of raw materials into the processing unit 12 through input valve 18, and the exit of dehydrated materials from the processing unit 12 through output valve 20. The input feed unit 14 and output feed unit 16 may be of any known design or construction as would be known in the material handling arts. In a preferred embodiment, the processing unit 12 comprises an irradiation chamber that is maintained in a vacuum condition. In such embodiment, the input feed unit 14 and output feed unit 16 would be understood to be adapted to maintain a desired atmospheric condition (e.g. vacuum) within the processing unit 12 of apparatus 10. Flange supports 22 are provided at either end of processing unit 12 for sealed connection to input feed unit 14 and output feed unit 16, and for mounting on a support frame (not shown).

Input feed unit 14 and output feed unit 16 are illustrated in FIG. 1 as a series of valves separated by air locks, but the selection and implementation of other types of conventional input and output feed units that are capable of maintaining a pressure differential within processing unit 12 whilst permitting the input and output of materials and product would be within the ordinary skill of those knowledgeable in the art. In the illustrated embodiment, a single processing unit 12 is fastened between the input feed unit 14 and the output feed unit 16; however, it will be understood that, in other embodiments, a plurality of processing units 12 may be coupled together in an end to end arrangement, either directly via flange supports 22, or via one or more intervening input feed units 14 and/or output feed units 16. In such embodiment, the material being treated would therefore be subjected to a series of dehydration treatments where that is deemed necessary. As will be understood, the need for additional processing units 12 would depend, for example, on the nature of the material being dehydrated. That is, some materials may require more dehydration than others. It will also be understood that, in other embodiments, the length of processing unit 12 may be varied to subject the material to any desired microwave exposure time.

In the embodiment illustrated, processing unit 12 comprises a vacuum chamber 24, at least one microwave source 26, and at least one port 28 configured for connection to a conventional vacuum generator (not shown) and for removal of moisture from vacuum chamber 24. In the embodiment of FIG. 1, ten microwave sources 26 and three ports 28 are illustrated. However, it will be understood that any number of microwave sources 26 or ports 28 may be provided and that such numbers would depend, for example, on the length of the processing unit 12.

Figure 2A:
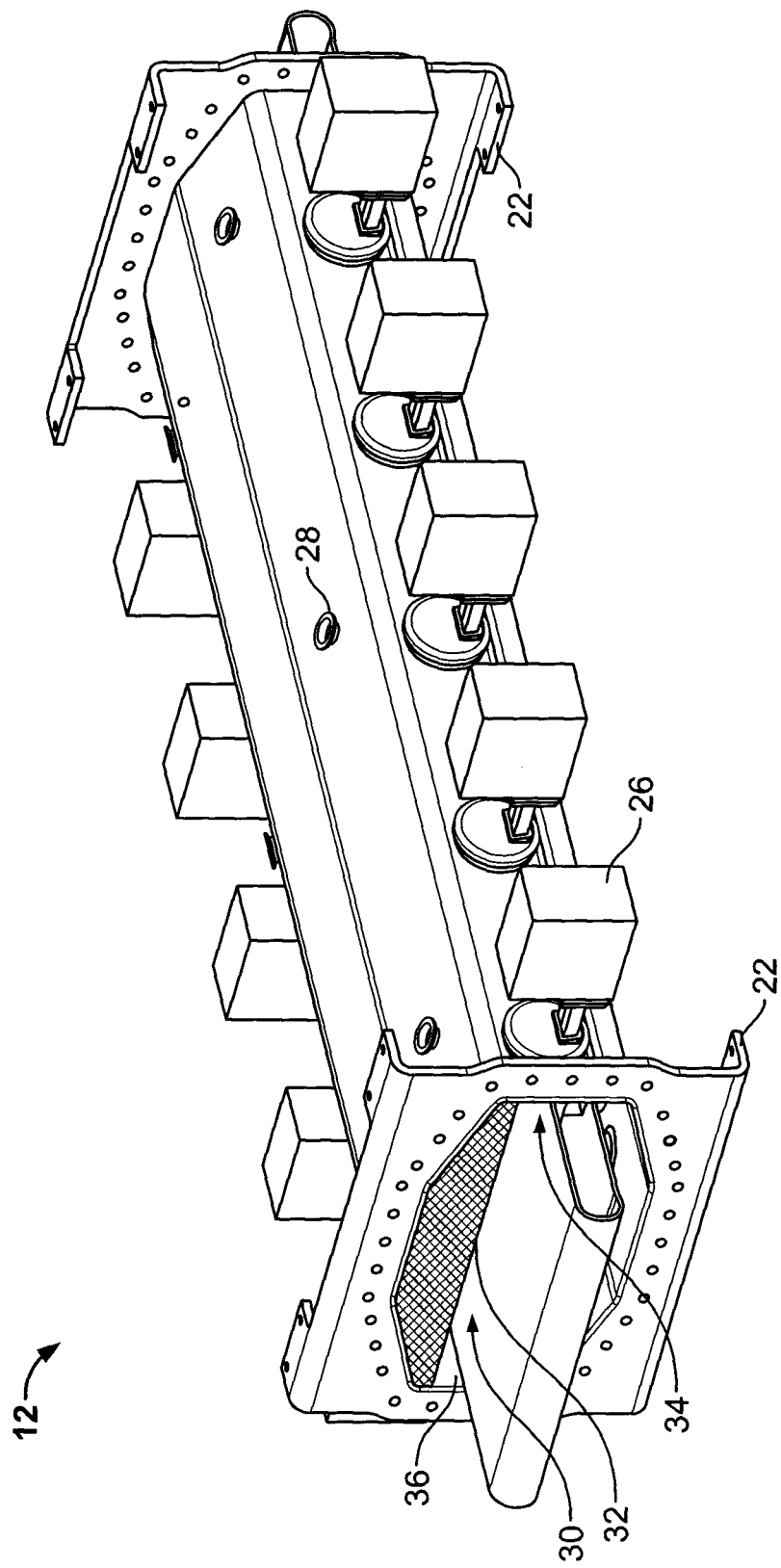
FIG. 2a is a side perspective view of the embodiment of FIG. 1 without an input feed unit or an output feed unit.
Figure 2B:
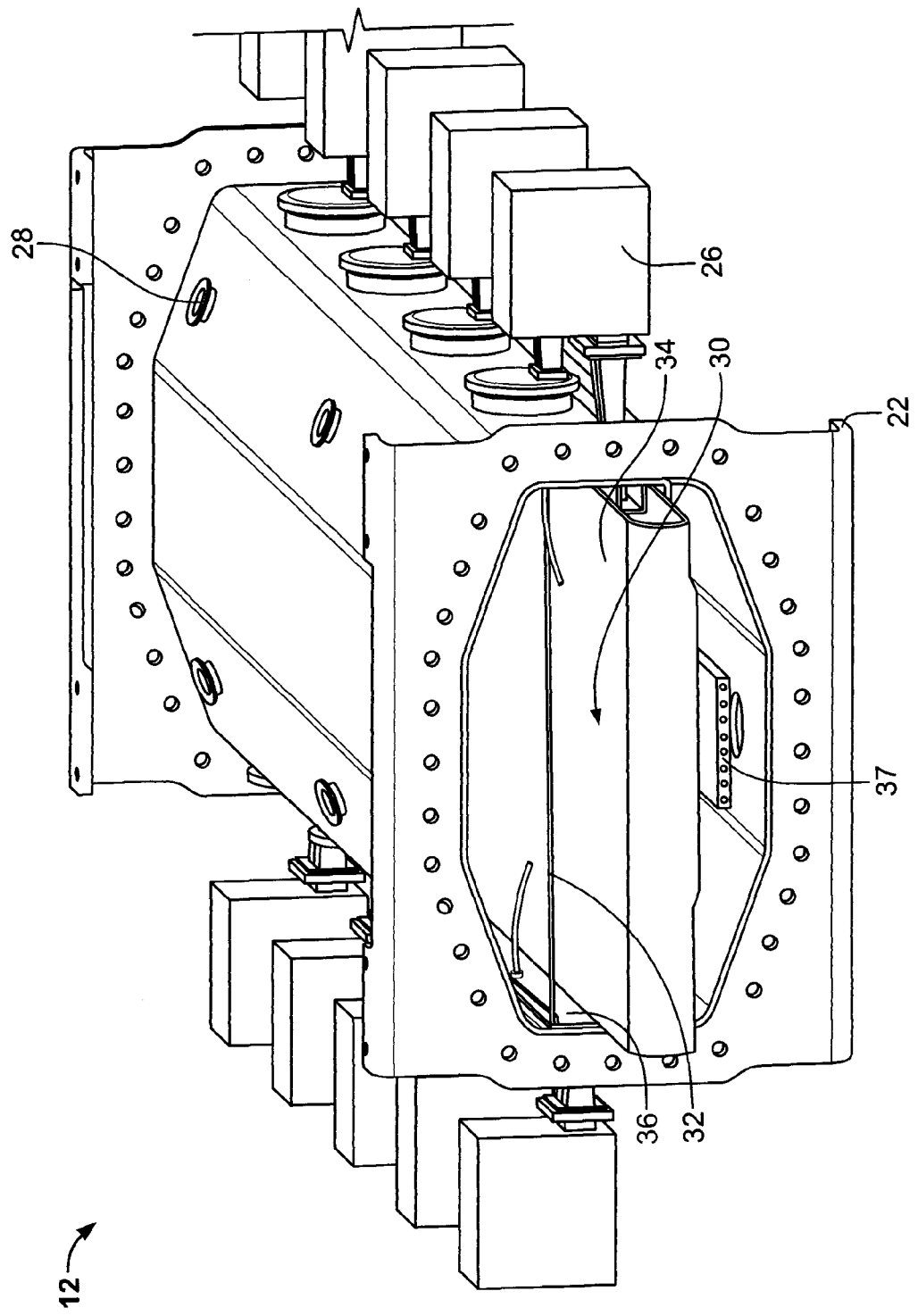
Figure 3:
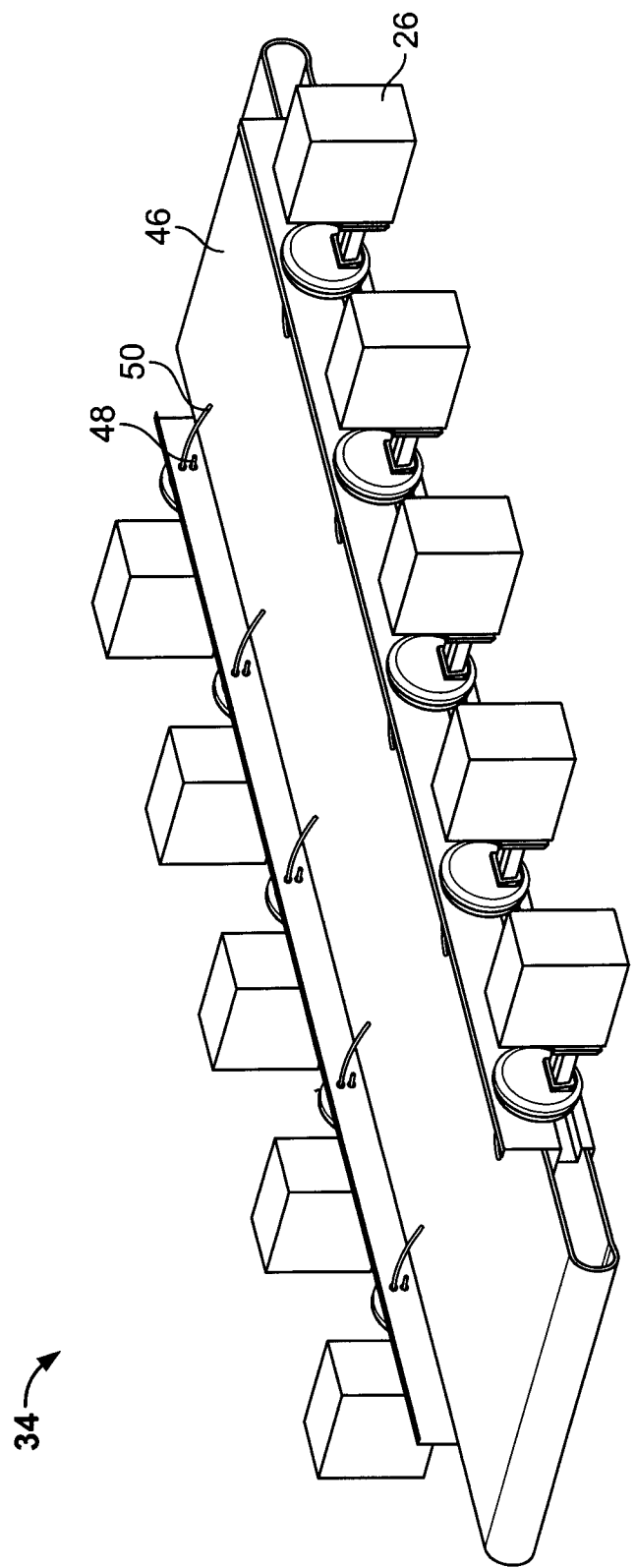
FIG. 3 is a perspective view of the conveyor tray assembly of the embodiment of FIG. 1.

In embodiments of the invention where a vacuum is applied, such cacuum may be generated by any known means such as with a conventional pump and condenser, such as shown at 37 in FIG. 2b. As known in the art, having the water condense within the vacuum chamber, by placing the condenser within the vacuum/irradiation chamber, increases the effectiveness of the vacuum. However, this also presents two problems, namely, (i) the condensed water can absorb the microwaves in the chamber and thereby decrease the effective microwave field within the chamber and (ii) arcing locations may be created on the edges of the condenser. According to embodiments of the invention, the condenser may be located either outside of the vacuum chamber or within. If located outside of the chamber, and thereby having any water condense externally of the chamber, the above problems would be alleviated. However, even if the condenser 37 is located within the chamber, for the reasons discussed above, the above mentioned problems would be mitigated since the invention involves the application of microwaves in the near-field range. That is, the applied microwaves would be absorbed primarily by the material being dehydrated and, therefore, a minimal amount of radiation would be available for absorption by the condensed water. Nevertheless, in order to further mitigate against such microwave absorption, a suitable radiation (i.e. microwave) shield or screen, not shown, may be provided at a location above the condenser and condensed water pool (not shown), and below waveguides 42. In this manner, even in the event of escape of some microwave radiation after application to the material, such escaped waves would be prevented from reaching the condenser or the condensed water pool.

In other embodiments of the invention, a radiation (i.e. microwave) shield or screen 32 may be provided at a distance above the conveyor 46. Such screen 32 serves to contain the reflection of any escaped radiation. However, it will be understood that a screen such as shown at 32, while having certain advantages (i.e. containment of the microwaves), may also result in certain deleterious effects if not managed. For example, the concentration of microwaves within the region just above the conveyor may result in hot spots being formed, which in turn could result in burning of the material being dehydrated.

Placing the condenser 37 within vacuum chamber 24 but outside of microwave containment vessel 30 (in order to isolate the condenser from microwave radiation) enhances condensation and a reduction in the vacuum load of the apparatus 10. In various VMD apparatuses known in the art, the condensers are contained within the vacuum chamber but there is no provision to isolate the condensed water from being re-exposed to microwaves. As a result, the known VMD apparatuses allow for recycling of water from the condenser into vapor and then condensing once again. This process of revaporization and recondensation decreases the efficiency of the VMD apparatus. Conversely, according to an embodiment of the present invention, by employing a microwave containment vessel 30 to isolate the condenser from microwave radiation whilst still permitting the condenser to be in close proximity to the vaporization event, efficiency is enhanced. In other embodiments, moisture vapor may be removed through the incorporation of ionomers (such a Nafion™ membranes manufactured by Perma-Pure™) within the vacuum chamber 24 to ionically combine with moisture and allow transfer of the vapor directly to tubing leading to the condenser without affecting the vacuum pressure.

Figure 4:
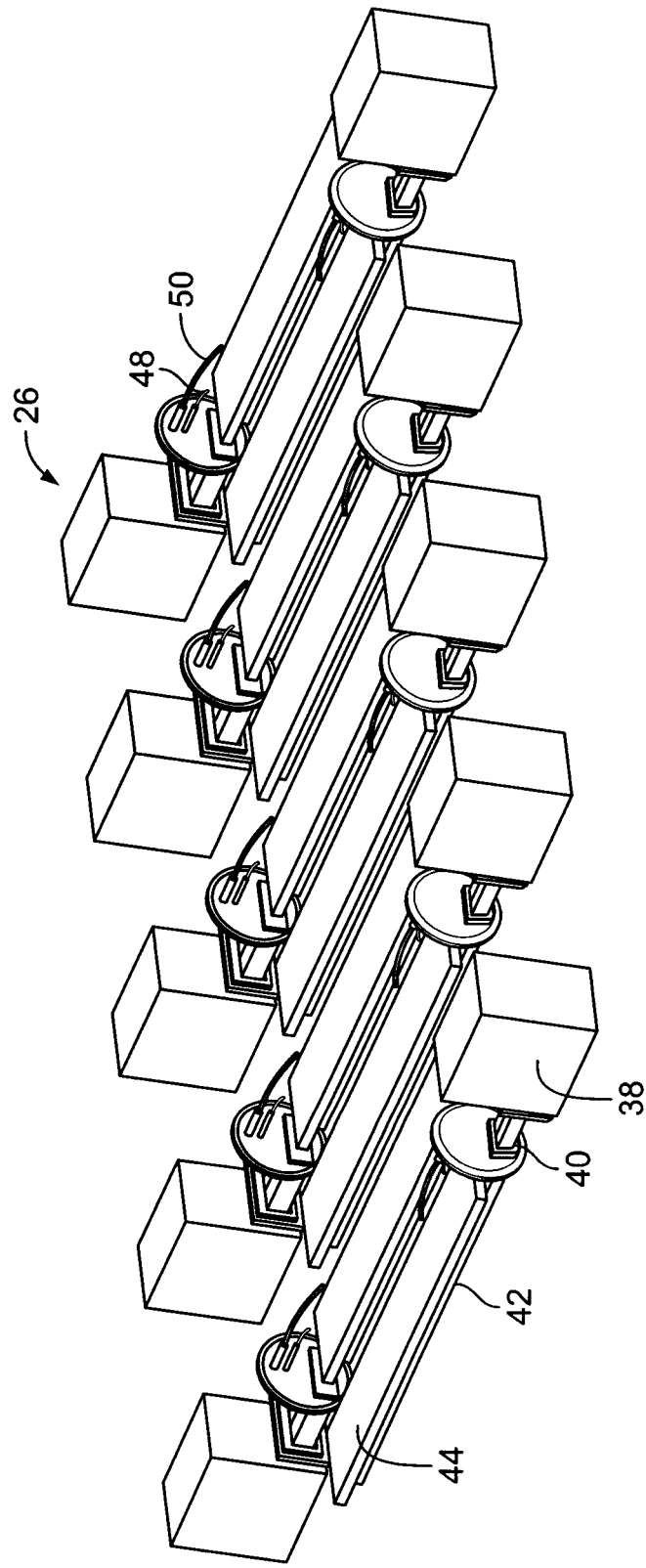
FIG. 4 is a perspective view of the plurality of microwave sources of the embodiment of FIG. 1.
Figure 5:
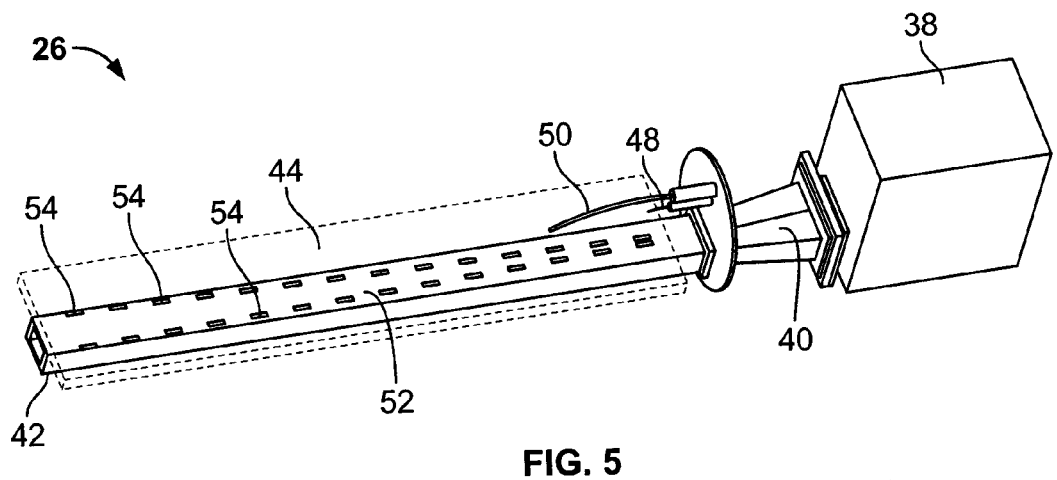
FIG. 5 is an enlarged perspective view of a single microwave source of the embodiment of FIG. 1.
Figure 6:
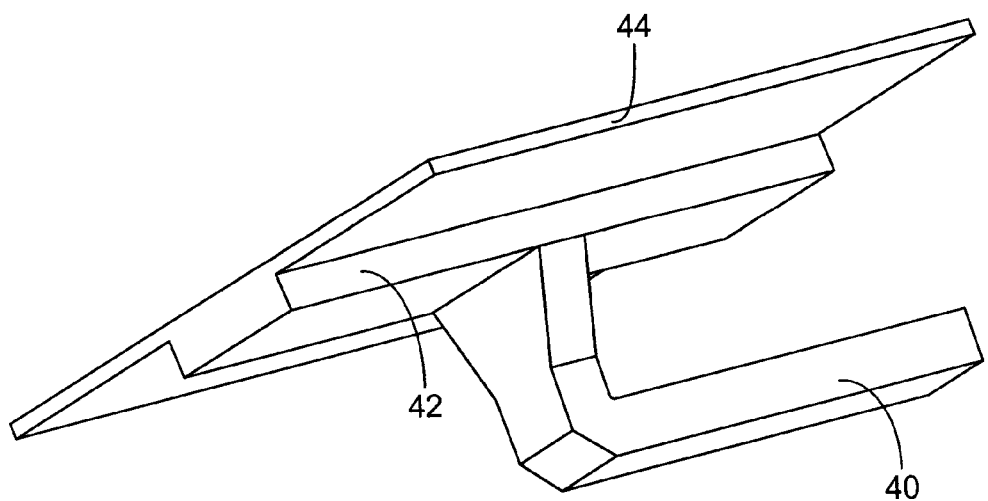
FIG. 6 is an enlarged perspective view of a single non-gas dielectric wave guide assembly in accordance with an alternate embodiment of the disclosed subject matter.
Figure 7:
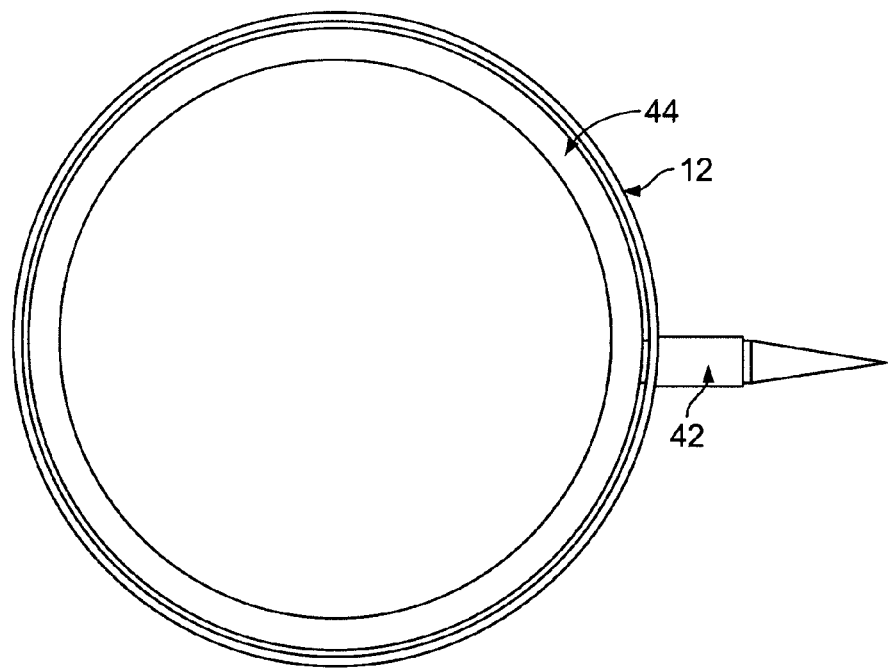
FIG. 7 is an enlarged perspective view of a single non-gas dielectric wave guide assembly in accordance with a further alternate embodiment of the disclosed subject matter.
Figure 8:
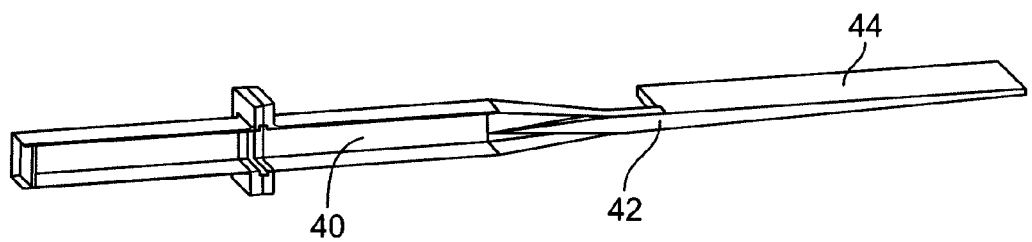
FIG. 8 is an enlarged perspective view of a single non-gas dielectric wave guide assembly in accordance with a further alternate embodiment of the disclosed subject matter.
Figure 9:
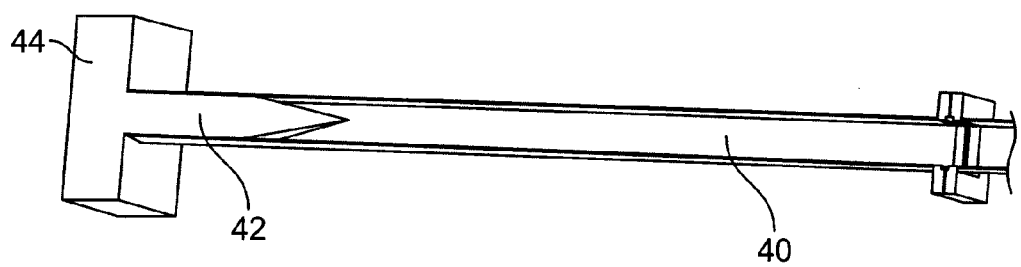
FIG. 9 is an enlarged perspective view of a single non-gas dielectric wave guide assembly in accordance with a further alternate embodiment of the disclosed subject matter.

As is best seen in FIGS. 4 and 5, in one embodiment of the invention, each microwave source 26 comprises a microwave emitter 38 coupled, via at least one conventional dielectric transition 40, to at least one non-gas dielectric waveguide 42 and a substrate, preferably a dielectric substrate, 44. The substrate 44 would preferably comprise a lens or microwave applicator. The dimensions of the lens 44 can be calculate based on the U (permittivity of the medium relative to air) and the Er (dielectric constant of the medium relative to air) values of the dielectric material from which the waveguide 42 and lens 44 are constructed. For example, based upon the U and Er values of the waveguide 42 and lens 44 and using known formulae, such as taught in U.S. Pat. No. 8,299,408, a person skilled in the art would be able to construct a waveguide 42 that supports any desired electromagnetic (i.e. microwave) transmission mode, as well as a substrate (lens) 44 that disperses microwave radiation. U.S. Pat. No. 6,037,908 also teaches the manufacture of dielectric lenses and antennae.

The apparatus shown in the Figures also includes a conveyor 46, on which the material being dehydrated is conveyed through processing unit 12. The conveyor 46 may similarly be constructed of a dielectric material, and is dimensioned (in relation to its U and Er values) such that electromagnetic radiation cannot propagate through the conveyor 46 in regions where conveyor 46 is not in close proximity to a lens 44. Thus, each microwave source 26 provides a defined zone for delivering microwave energy to the material being dehydrated. In a preferred embodiment, the microwave radiation is delivered to the material in the near-field region. As would be understood by persons skilled in the art, in such region, evanescent coupling of the microwave energy to the material being dehydrated occurs.

In one embodiment, the conveyor 46 itself may comprise the lens referred to above. That is, the conveyor belt 46 may comprise a dielectric material that enables it to act as the substrate or lens 44 referred to above. In such case, it will be understood that a separate lens 44 would not be needed for the apparatus. Suitable materials for belt 46, particularly to act as a lens, would include high density polyethylene (HDPE).

At least one RF sensor 48 and thermal sensor 50 are provided in the apparatus of the invention. In a preferred embodiment, at least one RF sensor 48 and at least one thermal sensor 50 are provided in close proximity to each near-field coupling zone. Readings from sensors 48 and 50 are fed back to a PLC (not shown) programmed for suitable control of the output of microwave generators 26 and/or the conventional vacuum generator. The RF and thermal sensors can be any sensor as known in the art.

In the illustrated embodiment, the dielectric waveguide 42 comprises a slotted antenna 52 (see FIG. 5). The arrangement of slots 54 is selected to provide even transmission of radiation from the waveguide 42 to the substrate, or lens or applicator, 44. The size, location, and distribution of slots 54 may, accordingly, be determined according to the U and Er values of the dielectric material being utilized, and by the frequency of the electromagnetic radiation being transmitted.

The relationship between the intensity of microwave radiation generated by any given microwave generator 26 and the microwave radiation detected by a corresponding RF sensor 48 is utilized, in conjunction with the current thermal properties of the material being dehydrated (as detected, for example, by a corresponding thermal sensor 50), to calculate the current moisture level of the product being dehydrated, as well as the relative risk of thermal runaway.

Electrically small loops, those whose total conductor length is small (typically $\frac{1}{10}$th of the wavelength in free space) compared with the wavelength in free space, are the most frequent receiving antennas used as probes with field strength measurements. When an electrically small loop is used as a receiving antenna, the voltage developed at its open-circuited terminals V is proportional to the component of the incident magnetic flux density B normal to the plane of the loop: $V=\omega jNAB$, in which the incident field is assumed to be uniform over the area of the loop. This simple relation between V and B makes the small loop useful as a probe for measuring the magnetic flux density, where: N=number of turns and A=area of loop The small loops are constructed from coaxial cable with the internal conductor looped back and attached to the outer shielding which allows inexpensive probes to be inexpensively manufactured and to be easily located in areas of interest. The voltage from the probe is rectified by a diode and measured with a voltage meter or used as a PLC voltage input.

In operation in a VMD apparatus in accordance with the illustrated embodiment, a sensor, once it is installed at the desired location, needs to be calibrated by measuring the voltage output with no product to be dehydrated present at varying microwave power settings. Then material to be dehydrated is placed under the sensor, typically by stopping the conveyor belt, and voltages are measured at the same power settings used in the determination of sensor response with no material to be dehydrated present. This provides a data set which corresponds to power supplied and dielectric effects of the material to be dehydrated. Combining this calibration with the data set previously developed from measurements of the material to be dehydrated and its dielectric constant at different moisture levels a control algorithm can then deliver power to the material to be dehydrated without exceeding the internal dielectric heating requirement for a desired level of moisture within the material at a particular stage of the dehydration process. To provide a voltage suitable for control purposes, a small excess power level is required to allow the probe to sense a microwave level above the material being dehydrated. However, operating within the near-field of the dielectric waveguide or substrate, the microwave field would generally be evanescent and would not propagate into free space and lead to high voltage concerns from reflected waves within the vacuum chamber.

An algorithm within the PLC uses the inputs from the various sensors provided in the apparatus and controls the microwave generator 26 so as to generate an appropriate amount of microwave radiation, calculated to ensure the conversion thereof into latent energy of vaporization, and to ensure that the material being dehydrated dehydrates in desired conditions. The sensors transmitting information to the PLC would typically include field sensors, including sensors for measuring field intensity and/or wave frequency, and temperature or quality sensors adapted to measure parameters of the material. For example, some examples of the latter sensors include fiber optic devices, such as the Ocean Optics OptoTemp 2000™ probe, which is unaffected by microwaves for point and contact measurements, or an infra-red (IR) sensor such as Omega Infrared™ temperature sensor model OS35-3-MA-100C-24V, which would provide a non-contact temperature measurement and moisture measurement of the material using a dielectric microwave measurement probe such as the Hydronix Hydro-Probe II™. Since some microwave energy may be absorbed by the substrate (or lens) 44, waveguide 42 and/or conveyor 46, the total energy generated by the microwave generator 26 is not transmitted directly to the material being dehydrated.

As the material being dehydrated loses moisture, its dielectric value generally decreases, and the material becomes less effective at transferring microwave energy directly into the energy of vaporization. The presently disclosed subject matter accordingly also provides for the use of thermal energy accumulated in the material being dried, the waveguide 42, the substrate 44, and the conveyor 46 to heat the water contained within the material being dried in a controlled and measured manner. This approach allows one skilled in the art to control the intensity of energy supplied to the material being dehydrated via substrate 44 and/or conveyor 46, as well as the speed at which the conveyor 46 moves, in one or more processing units 12 such that more or less of the microwaves generated are applied directly to vaporization or indirectly (through thermal transfer) to vaporization.

This approach also permits the control of the vapor pressure within the microwave processing unit(s) 12 in such a manner as to allow vaporization to occur at low temperatures as the material's dielectric value decreases and dehydration progresses, and has the added benefits of greater energy efficiency while still providing a reduction in risk of thermal overload of the material being dehydrated. As a result, arcing (which can result in carbonization events in the material being dehydrated) is avoided or reduced, and end products with superior physical, organoleptic and/or chemical qualities may be produced.

The rate of progress through each processing unit 12 may be regulated by the algorithm operating within the PLC to ensure that adequate reduction in moisture is achieved before the material is removed from the final output feed unit 16. In addition, the rate of progress from isolated processing units 12 can be used to control the rate of vaporization at different moisture levels of the products being dehydrated. As each processing unit 12 can be fabricated with different substrates 44, conveyors 46 and waveguides 42, the PLC can also control the progress of dehydration to best match the material's current optimal dehydration process.

FIGS. 6 to 9 illustrate alternate waveguide assemblies in accordance with embodiments of the disclosed subject matter.

Variations and Further Features

It is known that vacuum microwave dying (VMD) experiences severe problems with arcing and with non-uniform heating of material being dehydrated. Arcing results from high voltage nodes developing from constructive and destructive interference of microwaves which creates large voltage differences which lead to ionization and electrical arcing. Another reason for arcing is due to resonant structures which again develops high voltage and ionization. Low pressure atmospheres reduce the voltage necessary for ionization to occur, which increases the risk of ionization and arcing. The optimal design for microwave transmission would eliminate wave interference and remove resonant structures. It would operate at high pressures.

Another problem in microwave dehydrating is uneven heating of the material being dehydrated. This results from different surface areas and thicknesses of the material, which leads to different diffusion rates of water from within the material reaching the surface and changing into vapor. Energy needs to be supplied to provide the required heat of vaporization to the moisture to enable it to change state. This energy can be supplied through convection, conduction or radiation. Microwaves are one form of radiative heating. However, to provide heat to the water, the microwaves need to be absorbed and dissipated as heat in the material. The physics of dissipation of microwaves are well known, with such dissipation comprising primarily dielectric heating (vibration of molecular and atomic structures) and conductive heating (resistive heating). Achieving microwave heating is dependent on having the microwaves interact with the material to be dried. As will be understood, the physical and chemical properties of the material will affect the manner in which microwaves are dissipated. For example, the material may be too small to significantly interact with the applied microwaves or the material may only partially absorb the microwaves, that is, the material may reflect or refract the microwaves. Further the material can have properties that result in conducting of the microwaves, which can create magnetic fields that shield the material from further microwave absorption, or the material may be highly absorptive of microwaves, leading to large current flows and overheating. Additional combinations of size, composition, frequency of microwave, and the microwave field all lead to difficulties in providing a consistent controlled amount of energy being dissipated in the material being dehydrated.

In this disclosure, we teach that the problems experienced with the present VMD processes can be overcome by changing the way the microwaves are contained and directed within the vacuum environment. Presently, microwaves are contained in hollow metal waveguides and chambers and are directed into material to be dehydrated by metal or highly conductive materials of various geometrical shapes of horns and slots and openings which allow the microwaves to travel through free space or a microwave transparent window into the material to be dehydrated. This allows the microwaves to develop interference patterns and resonant conditions leading to the previously described difficulties of arcing and inconsistent temperature control in the material being dehydrated. We have established that if the microwaves are contained in a waveguide, such as a non-gas dielectric waveguide, through the use of dielectric material containing the microwaves, the effect is one of eliminating resonances and interferences from occurring inside the vacuum chamber. Just as high pressure atmospheres reduce ionization problems, a non-gas dielectric medium reduces ionization problems. The dielectric waveguides contain the microwaves allowing structures to be used which minimize or contain interferences as the non-gas dielectric is a stable configuration which does not vary the microwave pattern other than in amplitude, with the changing amounts or physical and chemical properties of the material to be dehydrated. The containment of the microwave fields by the dielectric waveguide removes reflections and resonances experienced when microwaves are allowed to reflect off surfaces in the vacuum chamber. The use of non-gas dielectric material can be combined with gas filled waveguides or conductive shielding to allow containment of microwaves from interacting with other components when the dielectric material is close to other objects. A characteristic of dielectric waveguides is that microwaves in the near-field are present on the surface and extend into free space surrounding the dielectric waveguide. This has been the main problem in the past with using microwave dielectric waveguides because they do interact with material which is within the near-field (typically less than two wavelengths of distance). The use of shielding material or a metal waveguide when the dielectric is required to be located close to other structures eliminates that problem. However, the combined near-field surface and free space wave allows one to bring the microwaves to the material being dehydrated without allowing them to propagate in the free space of the chamber. The material being heated or dehydrated when it is within the near-field of the guide will interact with the microwaves and dissipate the wave as heat. That means the dielectric waveguide has delivered the microwaves to the material without high voltage or reflection and resonance problems occurring. Dielectric waveguides can be manufactured which allow all of the normal well understood waveguide practices to be utilized. Power dividers, couplers, bends, Tees and antennae can be utilized.

Stripline, coax, planer guides, metal on dielectric all make use of dielectric properties to contain and utilize microwaves in non-gas filled microwave waveguides and structures. As taught herein, these same known methodologies can now be applied to VMD as the dielectric properties allow transitions from one use of dielectric material and configuration to another without generating ionization in the vacuum atmosphere and are able to deliver microwave energy to the material being dehydrated as long as the material is within the near-field of the non-gas dielectric material. Different dielectric materials can be used to change the wavelength of the microwaves at a particular frequency such that different size components of the material being dehydrated will be able to couple with the microwave frequency because their dimensions will allow the waves to better interact rather than being reflected or only partially enter, which would occur with a large change in wavelength. The ability to change the interaction of different size particles through changing dielectric properties reduces the complexity and cost of changing frequencies to allow coupling with varying particle sizes of the material being dehydrated.

The use of waveguides, such as dielectric waveguides, allows microwaves to be directed into the mechanical structures and components within the dehydrating chamber, also referred to herein as the irradiation chamber or, where a vacuum is used, a vacuum chamber. Preferably, the waveguides are made of materials that are compatible with food or meet other regulated requirements. Such materials include Teflon™, polypropylene, polyethylene, HDPE, or other engineered plastics or liquids. These materials may also be used for the walls forming the irradiation chamber or the conveyor belt. Further, the waveguides are manufactured with dimensions that are set to allow microwave propagation within the material as it acts as a dielectric waveguide. In this way, the microwaves can be directed through the system and into the mechanical structure and components which are in contact with the material to be dehydrated without any microwaves being propagated into the far-field free space of the chamber. By using the aforementioned waveguide materials and dimensions, it is possible to use surfaces within the chamber that would otherwise lead to cut off (stopping of the travel of the microwaves in free space from proceeding or propagating within), since the near-field regions of the microwaves will still allow heating of the material being dehydrated to occur.

In other embodiments, the apparatus may be provided with various concentration points for locally increasing the microwave field strength. The concentration points may be formed by providing small points or bumps on the surfaces of the irradiation chamber, including the walls of the irradiation chamber, the conveyor belt or the lenses. Such concentration points improve the heating effect in materials being dehydrated which have low absorbing characteristics. The concentration points would not allow a microwave field to be propagated to free space but they will concentrate the surface and near-field region into higher power areas. This type of interaction is referred to as evanescent wave interactions. Evanescent wave interaction can be generated in gas-filled waveguides, but the use of a non-gas dielectric material allows for significantly better coupling and modifying of the wavelength than can be achieved with varying openings in gas-filled waveguides.

In a further embodiment of the presently disclosed subject matter, there is provided a vacuum microwave drying apparatus wherein 1 wherein the microwave emitters are outside the vacuum chamber and the gas filled dielectric waveguide has solid dielectric material protruding into the vacuum chamber and thereby reduces reflection at the interfaces.

In a further embodiment of the presently disclosed subject matter, the apparatus of the invention includes at least one means of measuring the microwave field at a predetermined point or points. Such means of measuring the microwave field may comprise one or more detectors, which can be used measure the microwave field strength and allow for the manual or automatic modification of the behavior of the microwave generators in order to control the microwave energy supplied to the irradiation chamber. For example, the power generated may be limited to a percentage of microwaves in excess of what can be absorbed by the material being dehydrated and dielectric material within the chamber.

In a further embodiment of the presently disclosed subject matter, the apparatus of the invention includes a microwave generation and/or sensing means. Such means may comprise one or more detectors provided across the width and/or length of the irradiation chamber in order to better control or effect uniformity of energy transfer.

In a further embodiment of the presently disclosed subject matter, one or more of the dielectric waveguides may be provided with a cooling means in order to dissipate any generated heat. For example, the waveguide may be cooled by a circulating coolant around its exterior or there-within. In this way, the waveguide can be maintained at a given temperature so as avoid temperature dependent changes of mechanical or electrical properties of the waveguide.

In a further embodiment of the presently disclosed subject matter, the waveguide is arranged so as to result in coupling of the microwaves to the substrate or lens on which the material to be dehydrated is in close proximity or in contact. In this way, the microwaves travel through the substrate and couple with the material being dehydrated. The geometry and chemical properties of the substrate, preferably a dielectric substrate, tend to spread and even out the microwave field as well as act as a load to absorb excess microwaves and inhibit resonance and reflections. The heat generated within the dielectric waveguide and/or substrate can be transferred to the material to be dehydrated.

In a further embodiment of the presently disclosed subject matter, the substrate 44 may be omitted and, instead, the conveyor belt 46 may be adapted to perform the function described above. That is, the conveyor belt may comprise a dielectric material and thereby allowed to function in the same manner as the dielectric substrate described above. In one example, as discussed above, the conveyor belt may be made of a material such as HDPE, which has dielectric properties. In another aspect, the belt itself may function as the waveguide. For example, the belt may be of a sufficient thickness so as to allow the electromagnetic radiation from the generators to travel there-along until it is absorbed by the material. It will be understood that, according to the invention, the material would be subjected to near-field irradiation, preferably resulting in evanescent coupling of the radiation with the material. Alternatively, the conveyor may simply allow penetration of microwaves therethrough, which would result in irradiation of the material being dehydrated. In other embodiments, a bin, basket or plate may be used instead of a conveyor belt. Generally, any device may be used to move the material to be dehydrated from the feeding system to the discharge system, whose geometry and chemical properties increase the coupling of microwaves to the material being dehydrated or the distribution of microwaves across the material being dehydrated.

In a further embodiment of the presently disclosed subject matter, the measurement of the magnitude of non-coupled electromagnetic radiation within the apparatus may be sensed and used to quantify the current dielectric value of the material being coupled. Such measurement may be used to interpret the current dielectric value of the material as it is dehydrated. In this way, the microwave intensity or frequency may be modified to limit the percentage of microwaves in excess of what can be absorbed in the material from being generated.

In a further embodiment of the presently disclosed subject matter, the dielectric value of the material being dehydrated may be used to modify the vacuum pressure, in cases where a VMD process is used. As will be understood, modifying the vacuum pressure would allow for changes in the vaporization temperature. Thus, the temperature to which the material is subjected to during dehydration can be adjusted so to reduce the deleterious effects of heat on heat sensitive compounds within the material being dried are thereby reduced. For example, in the case of materials that are highly sensitive to damage from heat, the pressure within the irradiation chamber can be lowered, thereby reducing the requirement for a higher heat within the chamber. Heat sensitive compounds within materials being dehydrated may include, but are not limited to, antioxidants, pigments, vitamins and proteins, and enzymes, as well as other molecules from which nutraceutical and/or organoleptic properties are derived.

In a further embodiment of the presently disclosed subject matter, the lenses and/or waveguides may be shaped based on desired refraction and/or transmission properties, so as to adjust the distribution of microwaves as desired.

In a further embodiment of the presently disclosed subject matter the microwave generators may independently feed into the vacuum chamber and may be phase controlled so as to interlace the generated microwaves.

In a further embodiment of the presently disclosed subject matter, a number of processing units 10 may be connected in series. In this way, each of the processing units can be set with different operational parameters, such as pressure, microwave field strength or frequency, speed of travel there-through, etc. For example, the material to be dehydrated may be subjected to different vacuum pressures to control the temperature of vaporization at different stages as the material's dielectric values change in the course of the dehydration process. In such example, the material can be subjected to a lower pressure (i.e. deeper vacuum) when the dielectric value decreases, and/or the percentage of microwaves in excess of what can be absorbed in the material can be varied. The reduction in temperature of vaporization results in a reduction of the thermal damage done to the material being dehydrated over the course of the dehydration process.

In a further embodiment of the presently disclosed subject matter, the material being dehydrated may comprises fruits, vegetables, fruit juices, vegetable juices, pre-cooked grains, bacterial cultures, vaccines, enzymes, protein isolates, hydrocolloids, injectable drugs, pharmaceutical drugs, antibiotics, antibodies, meats, fish, seafood, milk, cheeses, whey protein isolates, yogurts, fruit extracts, vegetable extracts, meat extracts, or any combination thereof.

In a further embodiment of the presently disclosed subject matter, non-oxygen gases may be used to provide an atmosphere that is not oxidizing, in case where the material to be dehydrated include oxygen sensitive materials.

The present description has so far described the dehydration of materials by the removal of water. However, it will be understood that, in other embodiments, the present invention can be adapted to remove other vaporizable constituents, such as organic or inorganic solvents, or to cause a chemical change such as polymerizing a resin.

In a further embodiment of the presently disclosed subject matter, different loss properties and different surface characteristics in different locations may be used. Patterns of sharp edges such as narrow points, triangles, ridges, bumps can be added to the surface of the waveguide or substrate and thereby change the local field intensities.

In a further embodiment of the presently disclosed subject matter, sensors and emitters within the vessel may be employed along a pathway beside or along the surface used to convey the material to be dehydrated, such that an array of emitters with sensing and control circuitry would then adapt to any piece of material to be dehydrated as it passes through each element of the array.

In a further embodiment of the presently disclosed subject matter, the dielectric waveguide or substrate is a flowing dielectric which allows the dielectric properties to be changed to maximize the intensity of microwave radiation that can safely be applied to the material being dried.

In a further embodiment of the presently disclosed subject matter, there is provided a method of dehydrating a material comprising the steps of:

a. introducing an amount of a material to be dehydrated into a feed mechanism of a first processing unit;

b. reducing pressure within the feed mechanism to a pressure of less than atmospheric to match that of an adjacent vacuum chamber;

c. transferring the material to be dehydrated from the feed mechanism into the vacuum chamber where it is brought into contact or close proximity with a substrate which is excited by a plurality of microwave sources, such that the excess microwaves are limited and the stream of microwaves can be phase actuated and de-actuated and/or power level or frequency may be modulated such that the microwave streams interlace within the substrate, and the material to be dehydrated absorbs the greatest percentage of microwaves, and such that the heat absorbed within the substrate is allowed to transfer to the material to be dehydrated, and that detection of excess microwaves results in a PLC effecting the microwave source to change the amount or frequency of the microwaves or the dielectric properties of the waveguide or substrate;

d. drawing away the vapor resulting from supplying sufficient energy to vaporize moisture from the material to be dehydrated and out of the microwave containment vessel by a difference in vacuum pressure;

e. regulating the vacuum vessel pressure by the PLC such that the vacuum pump, condenser, and microwave sources ensure that the temperature of vaporization is at an optimized level for the current dielectric value of the material to be dehydrated;

f. as the material to be dehydrated conveys from the feed mechanism to the discharge mechanism, responding via the PLC to dielectric values of the material to be dehydrated;

g. transferring the material to be dehydrated into discharge mechanism of the first processing unit, where the material is isolated from the pressure of the prior vessel; and h. subjecting the material to be dehydrated to the vacuum pressure existing in the next processing unit, and repeating steps c to g as the dehydrating material progresses through each subsequent processing unit of the dehydrator and that a second lot of a defined quantity of material enters into the machine as described in step a, wherein the reduction of pressure from processing unit to processing unit corresponds to the optimal parameter for decreasing the temperature of vaporization of the material's dielectric drying profile.

In a further embodiment of the presently disclosed subject matter, there is provided a method of dehydrating a material in a VMD that comprises a single processing unit, the method comprising the steps of:

a. introducing the material to be dehydrated into a feed mechanism;

b. reducing pressure within the feed mechanism to a pressure of less than atmospheric to match that of an adjacent vacuum vessel;

c. transferring the material to be dehydrated from the feeding system into the vacuum vessel where it is brought into contact or close proximity with the substrate which is excited by a plurality of microwave sources such that the excess microwaves are limited and stream of microwaves can be phase actuated and de-actuated and/or power level or frequency such that the microwave streams interlace within the substrate, and the material to be dehydrated absorbs the greatest percentage of microwaves, and such that the heat absorbed within the substrate is allowed to transfer to the material to be dehydrated, and that detection of excess microwaves result in a PLC effecting the microwave source to change the amount or frequency of the microwaves;

d. drawing away the vapor resulting from supplying sufficient energy to vaporize moisture in the material to be dehydrated and out of the microwave containment vessel by a difference in vacuum pressure;

e. regulating vacuum vessel pressure by the PLC such that the vacuum pump, condenser, and microwave sources ensure that the temperature of vaporization is at optimal level for the current dielectric value of the material to be dehydrated;

f. responding via PLC control as the material to be dehydrated dehydrates to changes in dielectric values of the material to be dehydrated by modifying the vacuum vessels operational pressure and/or the amount or frequency of microwaves generated to reduce the temperature of the material to be dehydrated as its dielectric value decreases until such point as the dielectric value corresponds to that of the material's target moisture level; and g. removing the dehydrated material through a discharge mechanism.

In a further embodiment of the presently disclosed subject matter, there is provided a method as described herein above, wherein the reduction of pressure from processing unit to processing unit corresponds approximately to that of the optimal parameter for decreasing the temperature of vaporization of the material to be dehydrated, as the dielectric decreases over the course of dehydrating the material to be dehydrated to the desired moisture level.

In a further embodiment of the presently disclosed subject matter, there is provided a method as described herein above, wherein the material to be dehydrated comprises or is chosen from fruits, vegetables, fruit juices, vegetable juices, pre-cooked grains, bacterial cultures, vaccines, enzymes, protein isolates, hydrocolloids, injectable drugs, pharmaceutical drugs, antibiotics, antibodies, meats, fishes, seafood, milk, cheeses, whey protein isolates, yogurts, fruit extracts, vegetable extracts, meat extracts, or any combination thereof.

In a further embodiment of the presently disclosed subject matter, there is provided a method as described herein above, wherein the material to be dehydrated is fresh and/or frozen.

In a further embodiment of the presently disclosed subject matter, there is provided a method as described herein above, wherein the material to be dehydrated is encapsulated in a hydrocolloid.

In a further embodiment of the presently disclosed subject matter, there is provided a method as described herein above, wherein the reductions in pressure range from 0.01 to 100 Torr, more preferably from 0.1 to 30 Torr, or less than or equal to 760 Torr. As described above, providing a vacuum within the irradiation chamber is preferred so as to reduce the vaporization temperature of the water or other substance being removed from the material. The main advantage offered by such reduced pressures is the reduction in any damage to heat sensitive materials or components within the materials. However, as will be understood, in some embodiments, a vacuum may not be necessary within the irradiation chamber.

In a further embodiment of the presently disclosed subject matter, there is provided a method as described herein above, wherein the reductions in pressure are less than or equal to 760 Torr. p In a further embodiment of the presently disclosed subject matter, there is provided a method as described herein above, wherein the method is conducted in non-vacuum conditions, that is under a pressure greater than or equal to 760 Torr (or 1 atmosphere).

Although the invention has been described with reference to certain specific embodiments, various modifications thereof will be apparent to those skilled in the art. Any examples provided herein are included solely for the purpose of illustrating the invention and are not intended to limit the invention in any way. The drawings provided herein are solely for the purpose of illustrating various aspects of the invention and are not intended to be drawn to scale or to limit the invention in any way. The scope of the claims appended hereto should not be limited by the preferred embodiments set forth in the above description, but should be given the broadest interpretation consistent with the present specification as a whole. The disclosures of all prior art recited herein are incorporated herein by reference in their entirety.

What is claimed is:

1. An apparatus for vaporizing a vaporizable substance from a material, the vaporizable substance being subject to vaporization upon exposure to electromagnetic energy, the apparatus comprising:

a processing chamber;

one or more electromagnetic wave generators for generating electromagnetic waves having electromagnetic energy; and, one or more non-gas dielectric waveguides adapted to confine the electromagnetic waves and to direct the generated electromagnetic energy to the material by evanescently coupling the electromagnetic energy to the material.

2. The apparatus of claim 1, wherein the one or more non-gas dielectric waveguides are comprised of a solid, semi-solid or liquid material.

3. The apparatus of claim 1, further comprising one or more field concentration points, for concentrating the electromagnetic energy in discrete locations.

4. The apparatus of claim 1, wherein the electromagnetic energy is microwave energy.

5. The apparatus of claim 1, wherein the vaporizable substance is water.

6. The apparatus of claim 1, wherein the apparatus further comprises a vacuum chamber within the processing chamber and wherein the vacuum chamber is controlled manually or automatically.

7. The apparatus of claim 1, wherein the one or more waveguides further comprise lenses for transmitting the electromagnetic energy from the waveguides to the material.

8. The apparatus of claim 1, further comprising means for monitoring surface temperature of the material.

9. The apparatus of claim 1, wherein the apparatus comprises a plurality of wave generators and waveguides and wherein the plurality of wave generators and waveguides are adapted to deliver different electromagnetic field strengths and/or wave frequencies to the material.

10. The apparatus of claim 9, wherein the plurality of waveguides are arranged linearly and wherein the apparatus further includes a conveyor for transporting the material for exposure by each of said waveguides.

11. The apparatus of claim 10, wherein the waveguides are arranged below the conveyor.

12. The apparatus of claim 11, wherein the one or more waveguides further comprise lenses for transmitting the electromagnetic energy from the waveguides to the material.

13. The apparatus of claim 12, wherein the conveyor comprises one of the lenses or the waveguides.

14. The apparatus of claim 13, further comprising a condenser for condensing the vaporized substance after extraction from the material.

15. The apparatus of claim 14, wherein the condenser is located below the waveguides.

16. The apparatus of claim 15, further comprising a shield between the condenser and the waveguides to prevent the electromagnetic energy from contacting the condenser or the condensed substance.

17. The apparatus of claim 10, wherein the conveyor comprises a dielectric material.

18. The apparatus of claim 1, wherein the material is one or more of fruits, vegetables, fruit juices, vegetable juices, pre-cooked grains, bacterial cultures, vaccines, enzymes, protein isolates, hydrocolloids, injectable drugs, pharmaceutical drugs, antibiotics, antibodies, meats, fishes, seafood, milk, cheeses, whey protein isolates, yogurts, fruit extracts, vegetable extracts, or meat extracts.

19. A system for vaporizing a vaporizable substance from a material, the vaporizable substance being subject to vaporization upon receiving electromagnetic energy, the system comprising two or more of the apparatuses of claim 2 arranged in series, wherein the apparatuses of the series are adapted to deliver electromagnetic energy of different field strengths and/or frequencies.

20. A method for vaporizing a vaporizable substance from a material, the vaporizable substance being subject to vaporization upon exposure to electromagnetic energy, the method comprising:
providing a raw material containing the vaporizable substance;
introducing the raw material into a processing chamber;
heating the raw material with electromagnetic energy in the near field range of at least one non-gas dielectric waveguide by evanescently coupling electromagnetic energy of electromagnetic waves passing through and confined within the at least one waveguide with the material, the electromagnetic energy being sufficient to heat and vaporize the substance, thereby resulting in a treated material wherein a portion of the substance has been extracted from the raw material; and,
removing the treated material from the processing chamber.

21. The method of claim 20, wherein the at least one non-gas dielectric waveguide is comprised of a solid, semi-solid or liquid material.

22. The method of claim 20, wherein the electromagnetic energy is microwave energy.

23. The method of claim 20, wherein the vaporizable substance is water.

24. The method of claim 20, wherein the processing chamber is under vacuum conditions.

25. The method of claim 20, wherein the pressure within the processing chamber is monitored and/or controlled manually or automatically.

26. The method apparatus of claim 20, wherein the electromagnetic energy within the processing chamber is monitored and/or controlled manually or automatically.

27. The method of claim 20, wherein the electromagnetic energy field strength is monitored and/or controlled manually or automatically.

28. The method of claim 20, wherein the material is one or more of fruits, vegetables, fruit juices, vegetable juices, pre-cooked grains, bacterial cultures, vaccines, enzymes, protein isolates, hydrocolloids, injectable drugs, pharmaceutical drugs, antibiotics, antibodies, meats, fishes, seafood, milk, cheeses, whey protein isolates, yogurts, fruit extracts, vegetable extracts, or meat extracts.

29. A method for uniformly heating a material with electromagnetic energy, the method comprising:
providing a raw material;
introducing the raw material into a processing chamber;
heating the raw material with electromagnetic energy in the near field range of at least one non-gas dielectric waveguide by evanescently coupling electromagnetic energy of electromagnetic waves passing through and confined within the at least one waveguide with the material, the electromagnetic energy being sufficient to heat the raw material, thereby resulting in a heated material; and,
removing the heated material from the processing chamber.

30. The method of claim 29, wherein the at least one non-gas dielectric waveguide is comprised of a solid, semi-solid or liquid material.

31. The method of claim 29, wherein the raw material is one or more of fruits, vegetables, fruit juices, vegetable juices, pre-cooked grains, bacterial cultures, vaccines, enzymes, protein isolates, hydrocolloids, injectable drugs, pharmaceutical drugs, antibiotics, antibodies, meats, fishes, seafood, milk, cheeses, whey protein isolates, yogurts, fruit extracts, vegetable extracts, or meat extracts.

* * * * *